United States Patent [19]

Suzuki

[11] Patent Number: 4,503,503

[45] Date of Patent: Mar. 5, 1985

[54] TRANSACTION PROCESSING APPARATUS FOR STORING AND/OR CALCULATING COSTS, SALES, DEDUCTIONS, NUMBER OF SALES, COST MULTIPLIER, AND PROFIT, IN A DEPARTMENTALIZED FORMAT

[75] Inventor: Yasuo Suzuki, Nagaokakyo, Japan

[73] Assignee: Omron Tateisi Electronic Co., Kyoto, Japan

[21] Appl. No.: 315,890

[22] Filed: Oct. 28, 1981

[30] Foreign Application Priority Data

Nov. 5, 1980 [JP] Japan ............................... 55-156591

[51] Int. Cl.³ ..................... G06F 15/21; G06F 15/30
[52] U.S. Cl. ................................... 364/405; 364/404; 364/406; 364/464
[58] Field of Search ............. 364/401, 402, 403, 404, 364/405, 406, 407, 408, 464, 200 MS File, 900 MS File; 235/2, 6, 7

[56] References Cited

U.S. PATENT DOCUMENTS

| 3,710,085 | 1/1973 | Brewer et al. | 364/404 |
| 4,312,037 | 1/1982 | Yamakita | 364/405 |
| 4,317,172 | 2/1982 | Nakano | 364/405 |
| 4,360,872 | 11/1982 | Suzuki et al. | 364/405 |
| 4,389,707 | 6/1983 | Tsuzuki | 364/405 |

FOREIGN PATENT DOCUMENTS

| 2950949 | 7/1980 | Fed. Rep. of Germany . | |
| 1363264 | 8/1974 | United Kingdom . | |
| 1405055 | 9/1975 | United Kingdom | 364/404 |
| 1454266 | 11/1976 | United Kingdom . | |
| 1476951 | 6/1977 | United Kingdom . | |
| 1563998 | 4/1980 | United Kingdom . | |
| 2048530 | 10/1980 | United Kingdom | 364/406 |

Primary Examiner—Jerry Smith
Assistant Examiner—Allen MacDonald
Attorney, Agent, or Firm—Schwartz, Jeffery, Schwaab, Mack, Blumenthal & Koch

[57] ABSTRACT

A transaction processing apparatus comprises a memory having a sales information storing region defined for each of a plurality of commodity departments, a cost multiplier rate information storing region for storing in advance the cost multiplier rate, and a deduction amount information storing region. When the price of a commodity sold is entered from a keyboard, the price data is stored in the sales information storing region corresponding to the commodity department thereof. When a deduction amount is entered from the keyboard, the deduction amount is subtracted from the stored price data and the deduction amount data is stored in the deduction amount information storing region. Upon receipt of a command for preparing a report, the cost and the profit are evaluated based on the price data and the cost multiplier rate. A profit report is prepared based on the evaluated cost and profit and the stored sales information and deduction amount information.

6 Claims, 13 Drawing Figures

| | 311 TOTAL AMOUNT OF SALES PER DAY (DT) | 312 THE NUMBER OF TIMES ON SALES PER DAY (DC) | 313 TOTAL AMOUNT OF SALES (TL) | 314 LOSS ON SALES (NG) | 315 COST MULTIPLIER RATE (RC) |
|---|---|---|---|---|---|
| 31 DP1 | | | | | |
| 32 DP2 | | | | | |
| ⋮ | | | | | |
| 3n DPN | | | | | |

| FD FLAG | FN FLAG | WD REGISTER | WN REGISTER | X REGISTER | Y REGISTER |
|---|---|---|---|---|---|
| 3a | 3b | 3c | 3d | 3e | 3f |

FIG. 4    FIG. 5    FIG. 6    FIG. 7

REG  REG  Y  Y

[4] [5] [0]    [5] [0]    [1]    [2]

[DP1]    [DEDUCTION]    [REPORT]    [REPORT]

TRANSACTION PROCESSING APPARATUS FOR STORING AND/OR CALCULATING COSTS, SALES, DEDUCTIONS, NUMBER OF SALES, COST MULTIPLIER, AND PROFIT, IN A DEPARTMENTALIZED FORMAT

BACKGROUND OF THE INVENTION

1. Field of the Invention

The present invention relates to a transaction processing apparatus and more specifically to a novel transaction processing apparatus such as an electronic cash register adapted for evaluating profit based on the registered sales information and a predetermined cost associated information and for preparing profit report based on the profit.

2. Description of the Prior Art

A conventional transaction processing apparatus such as an electronic cash register is provided with an accumulator for accumulatively storing a total amount of sales per day and a counter for counting the number sales per day, per each commodity department, both being implemented as predetermined areas in a memory. The electronic cash register is then adapted to prepare a report by printing the amount of sales and the number sales per each commodity department.

A total profit obtained through sales of commodities is calculated by subtracting the total cost from the total amount of sales. Nevertheless, it is generally difficult to accurately determine the total cost of the total amount of sales. More specifically, the ratio of the total amount of sales to the cost (a cost multiplier rate) is usually described in a book, for example. In order to evaluate the profit based on such a cost multiplier rate, it is necessary to investigate the cost multiplier rate through by looking at the book each time. Generally, the total amount of sales also includes some price of the goods sold with some deduction and in this case, an accurate total cost cannot be evaluated. Furthermore, in order to evaluate a total profit based on the amount of sales and the cost multiplier rate, it is necessary to utilize an electronic calculator of a portable type, with the resultant disadvantage that evaluation becomes complicated.

SUMMARY OF THE INVENTION

Briefly described, the present invention is adapted to store in advance information associated with the costs of commodities, and to evaluate a profit based on the sales information including the price of the commodity sold and the cost associated information in response to a command for preparing a report, thereby to prepare a profit report covering the evaluated profit. Therefore, the present invention can eliminate the tedious procedure of investigating the cost multiplier rate from a cost book and of evaluating the profit by using a calculator.

In a preferred embodiment of the present invention, a transaction processing apparatus comprises a memory for storing accumulated sales information, cost multiplier rate information, and deduction amount information of each of the commodities for each of a plurality of commodity departments. If and when a commodity is sold with some deduction, the deduction amount information is subtracted from the accumulated sales amount information stored in the memory and the deduction amount information is stored simultaneously. When a command for preparing a report is applied, the cost and the profit amount are evaluated based on the accumulated sales price data and the cost multiplier rate, and a profit report is prepared which includes the accumulated sales amount information, the deduction amount information, and the evaluated cost and profit amounts stored in the memory. Accordingly, the deduction amount is not included in the accumulated sales amount and therefore a profit report can be prepared by evaluating the correct profit.

Accordingly, a principal object of the present invention is to provide a novel transaction processing apparatus capable of preparing a profit report through a relatively simple manual operation.

One aspect of the present invention is to correctly evaluate a profit without any influence upon the accumulated sales amount by the deduction amount when a commodity is sold with some deduction, thereby to prepare a profit report based on such profit amount.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
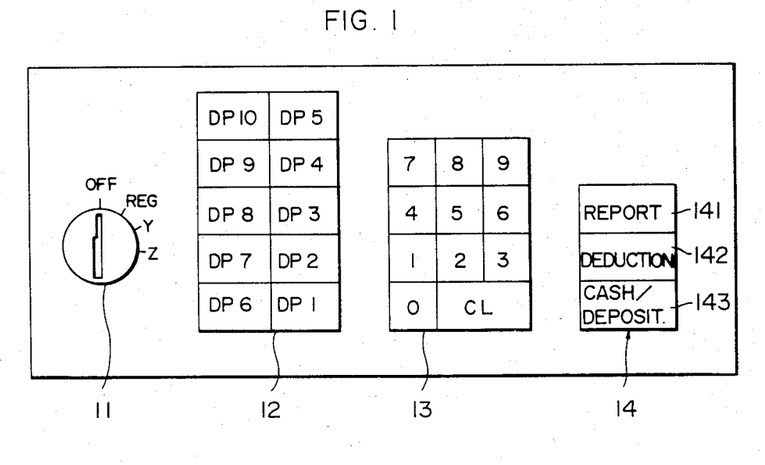
FIG. 1 is a view showing a keyboard of an electronic cash register in which one embodiment of the present invention is employed.

FIG. 1 is a view showing an arrangement of keys in a keyboard of an electronic cash register employing the present invention. Referring to FIG. 1, the keyboard 10 comprises a mode selecting switch 11, department keys 12, numeral keys 13, and function keys 14. The mode selecting switch 11 is adapted to select any one of an OFF mode, a registering mode, a check mode and a liquidation mode. The department keys 12 are adapted to enter any of department codes 1 to 10 (DP1 to DP10). Numeral keys 13 are adapted to enter information concerning the price of each commodity. The function keys 14 comprise a report key 141 for commanding preparation of a report, a deduction key 142 for specifying that the amount information entered from the numeral keys 13 on the occasion of deduction sales is a deduction amount, and a CASH/DEPOSIT key 143 for commanding a totalizing calculation of the information concerning the amount of each commodity entered from the numeral keys 13 thereby to make a totalizing operation representing completion of all the transactions.

Figure 2:
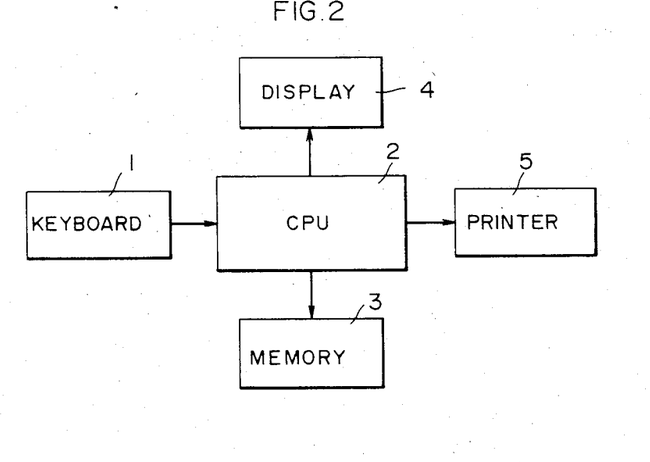
FIG. 2 is a block diagram showing an outline of an electronic cash register in accordance with one embodiment of the present invention.

FIG. 2 is a block diagram of an electronic cash register in accordance with one embodiment of the present invention. Referring to FIG. 2, a key entered signal entered from the keyboard 10 shown in FIG. 1 is applied to a central processing unit 2 which functions as an arithmetic logic unit. A memory 3, a display 4, and a printer 5 are provided operatively coupled to the central processing unit 2. As to be described in detail subsequently in conjunction with FIG. 3, the memory 3 serves to store the total amount of the sales and the cost multiplier rate.

Figure 3:
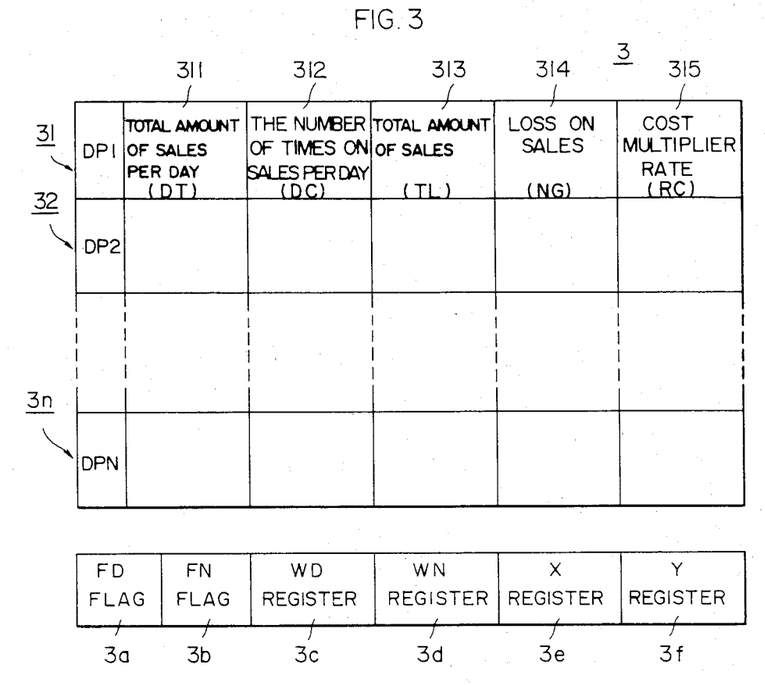
FIG. 3 is a view diagrammatically showing information stored in a memory.

FIG. 3 is a view diagrammatically showing a variety of information stored in the memory. Referring to FIG. 3, the memory 3 includes a plurality of storing regions corresponding to the commodity codes 1 to 10 of the department keys 12, respectively. An area 31 for storing the department code 1, for example, comprises an area (DT) 311 for storing a total amount of sales per day, an area (DC) 312 for storing the number of sales per day, an area (TL) 313 for storing the total amount of sales, an area (NG) 314 for storing the loss on sales such as the deduction amounts on the occasion of deduction sales, and an area (RG) 315 for storing the cost multiplier rate. Meanwhile, the area 315 stores 8,500/10,000 as the information concerning the cost multiplier rate if the cost multiplier rate is 85% for example. The areas corresponding to the department codes 2 to 10 also comprise the same areas as those of the department codes 1. The memory 3 further comprises an area 3a for storing an FD flag representing the deduction sales, an area 3b for storing an FN flag representing a manual operation of the numeral keys 13, and an area 3c serving as a WD register, an area 3d serving as a WN register, an area 3e serving as an X register, and an area 3f serving as a Y register, all these areas functioning as a working register necessary for an arithmetic operation by the central processing unit 2.

Figure 4:
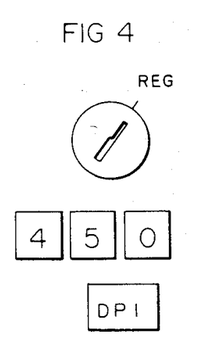
FIG. 4 is a view showing a sequence of manual operations of the keys for performing a registering operation.
Figure 5:
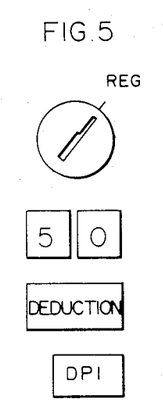
FIG. 5 is a view showing a sequence of manual operations of keys on a occasion of the deduction sales.
Figure 6:
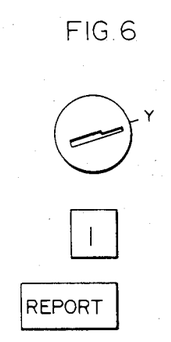
FIG. 6 is a view showing a sequence of manual operations of the keys for issuing a sales report.
Figure 7:
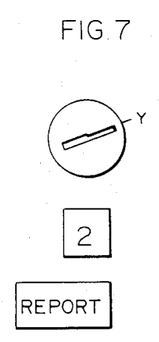
FIG. 7 is a view showing a sequence of manual operations of the keys for issuing a profit report.
Figure 8:
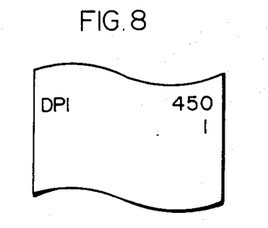
FIG. 8 is a view showing one example of a sales report.
Figure 9:
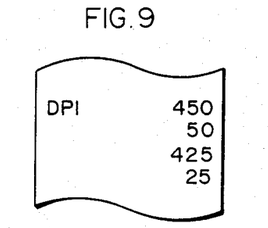
FIG. 9 is a view showing one example of a profit report.
Figure 10A:
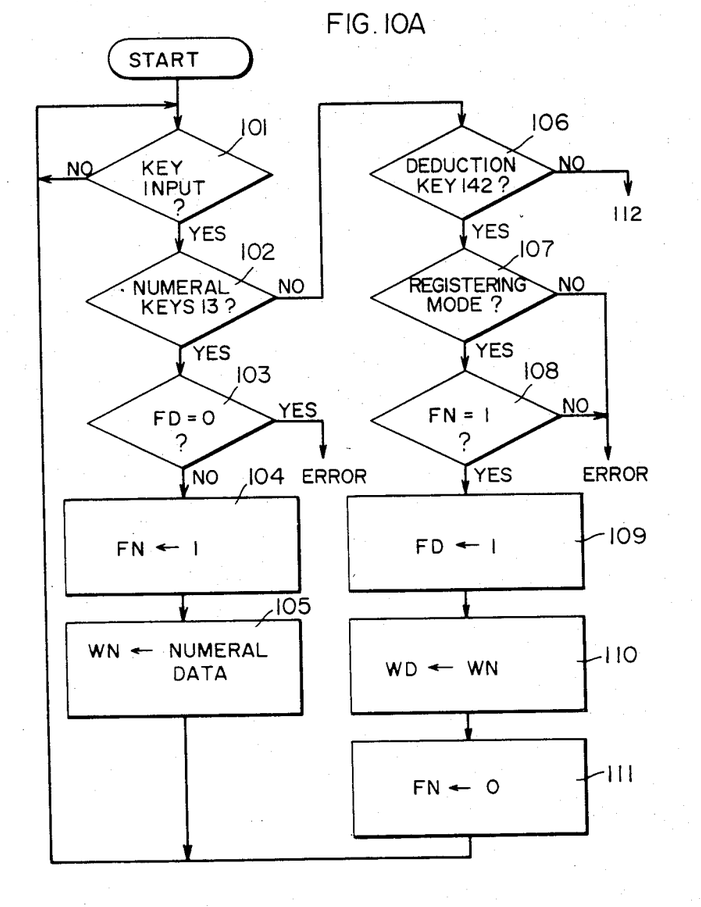
FIGS. 10A and 10B are flow diagrams for explaining a registering operation of one embodiment of the present invention.
Figure 10B:
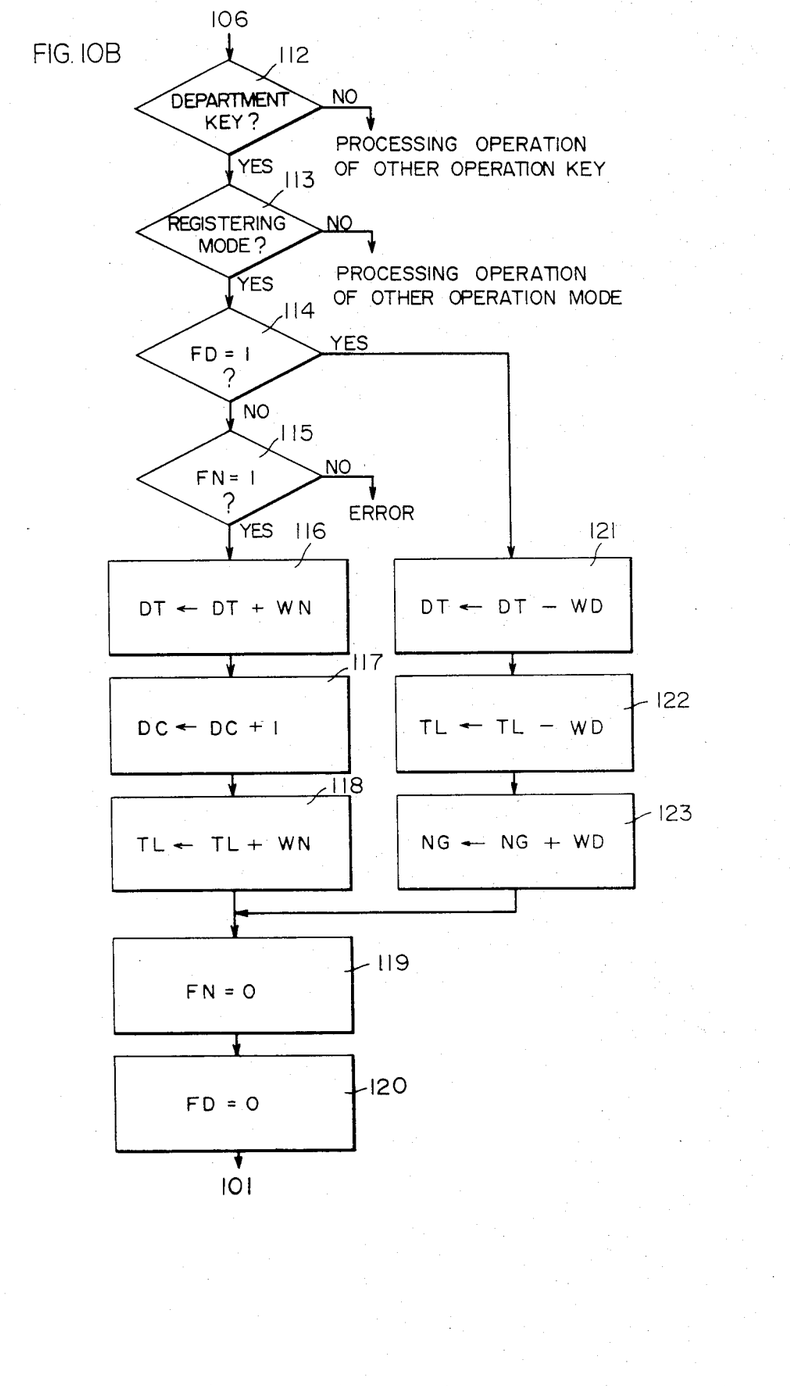
Figure 11A:
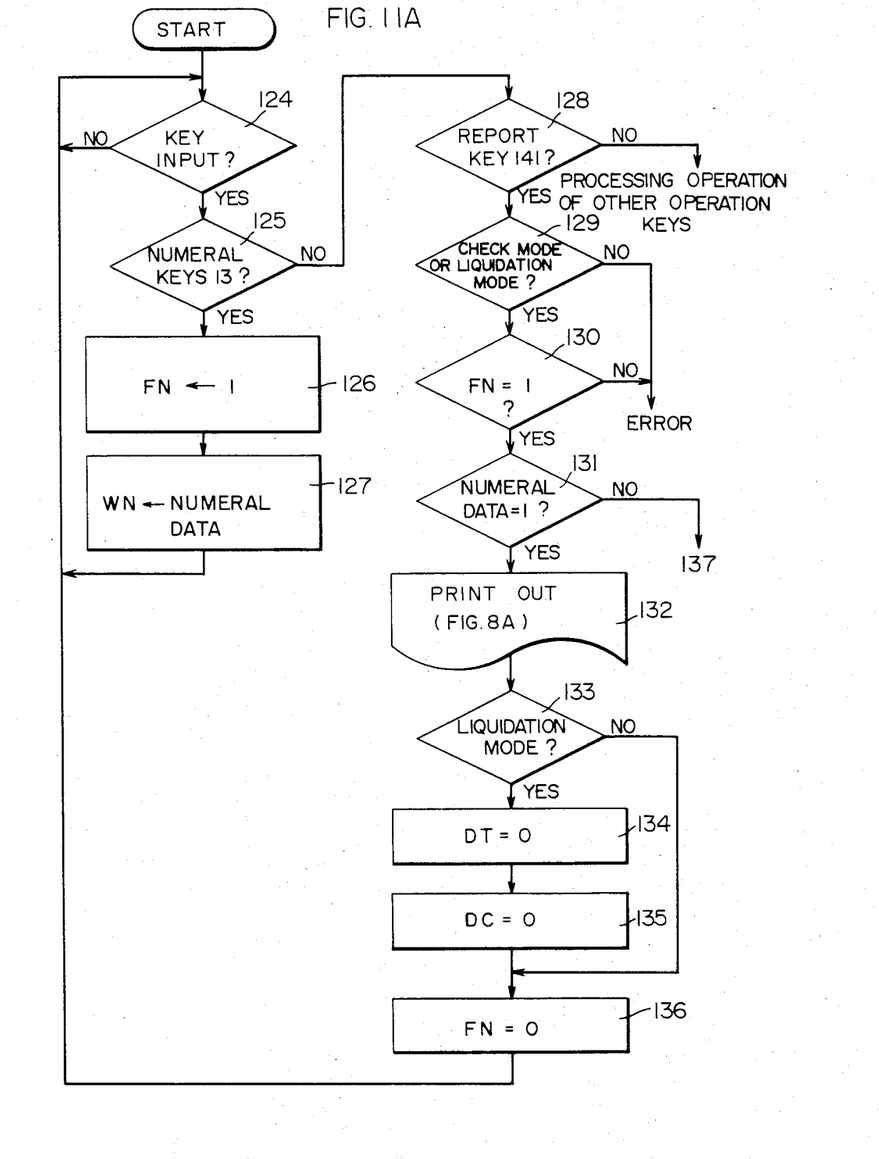
FIGS. 11A and 11B are flow diagrams for explaining an operation of issuing a report in accordance with one embodiment of the present invention.
Figure 11B:
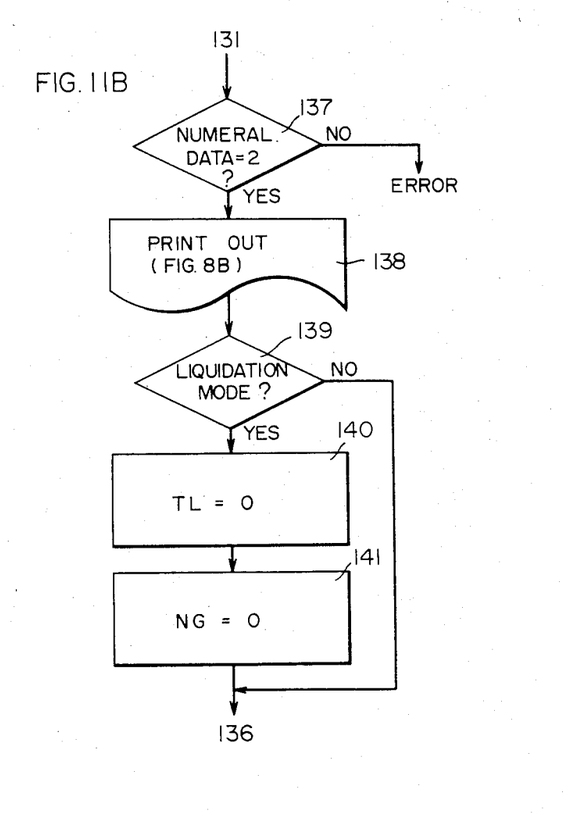

FIG. 4 is a view showing a sequence of manual operations of the keys for performing a registering operation, FIG. 5 is a view showing a sequence of manual operations of the keys on the occasion of the deduction sales, FIG. 6 is a view showing a sequence of manual operations of the keys in preparing a sales report, and FIG. 7 is a view showing a sequence of manual operations of the keys in preparing a profit report. FIG. 8 is a diagram showing one example of a sales report and FIG. 9 is a view showing one example of a profit report. FIG. 10 is a flow diagram for explaining a registering operation of one embodiment of the present invention and FIG. 11 is a flow diagram for explaining an operation in preparing a report.

Now referring to FIGS. 1 to 10, a specific operation of one embodiment of the present invention will be described. First a registering operation will be described. An operator sets a registering mode through manual operation of the mode selecting switch 11 in accordance with the sequence of manual operations of the keys as shown in FIG. 4. Then information concerning the price such as "450" yen is entered from the numeral keys 13. At the step 101 in FIG. 10A the central processing unit 2 continually determines whether a key entered signal is available from the keyboard 1, and is in a standby state until key entry is made. If and when key entry is made, at the step 102 it is determined whether the key entered signal is that of the numeral keys 13. Unless the key entered signal is that of the numeral keys 13, at the step 106 it is determined whether the same is that of the deduction key 142. If and when the key entered signal is that of the numeral keys 13, at the step 103 it is determined whether the FD flag has been set in the area 3a of the memory 3. If and when the FD flag has been set, then the central processing unit 2 performs error processing, whereas if the FD flag has not been set at the step 104 the FN flag is set in the area 3b. At the step 105 the numeral data "450" entered from the numeral keys 13 is stored in the WN register of the area 3d.

Returning to step 102, when an operator manually operates the DP1 key of the department keys 12, control passes through step 106 to step 112 in FIG. 10B. At the step 112, the central processing unit 2 determines that the key entry is of the department keys 12. Then at the step 113 it is determined whether the registering mode has been selected by the mode selecting switch 11. If the registering mode has not been selected, the central processing unit 2 performs a processing operation of another operation mode. In the case of the registering mode, at the step 114 the central processing unit 2 determines whether the FD flag has been set. If and when the FD flag has been set, deduction processing is performed, whereas if the FD flag has not been set, at the step 115 it is determined whether the FN flag has been set. If and when the FN flag has been set, at the step 116 addition is made of the total amount of sales per day in the area 311 and the content in the WN register 3d, whereupon the total amount is registered in the area 311. More specifically, the information concerning the price entered from the numeral keys 13 is added to the total amount of sales per day. At the step 117 "1" is added to the number of sales per day in the area 312. At the step 118 the content in the WN register 3d is added to total amount of sales in the area 313. At the steps 119 and 120 the FD flag and the FN flag are cleared, thereby to return to an initial condition.

In the case where an operator deducts "50" yen from "450" yen of the information concerning the price as previously registered, manual key operation is made in accordance with the sequence of manual operations of the keys as shown in Fig. 5 More specifically, "50" of the deduction amount is entered from the numeral keys 13. Then in the same manner as that described previously, the central processing unit 2 sets the FN flag at the step 104 in FIG. 10A and at the same time stores the registered information "50" in the WN register 3d. When an operator manually operates the deduction key 142, at the step 106 the central processing unit 2 determines that the deduction key 142 is manually operated and then determines at the step 107 whether the central processing unit 2 is in the registering mode. If and when the central processing unit 2 is in the registering mode, then at the step 108 the numeral keys 13 are manually operated and it is determined whether the FN flag has been set. In the event that any mode other than the registering mode has been selected or the FN flag has not been set, then the central processing unit 2 performs error processing. If and when the central processing unit 2 is in the registering mode and the FN flag has been set, then at the step 109 the FD flag is set in the area 3a for the purpose of specifying that the deduction key 142 is manually operated. At the step 110 the deduction amount information "50" stored in the WN register 3d is loaded in the WD register 3c. At the step 111 the FN flag is cleared, whereby the central processing unit 2 returns to an initial condition.

In order to specify that the above described deduction amount is related to a commodity of the department code 1, an operator manually operates the DP1 key of the department keys 12. Then the central processing unit 2 determines at the steps 112 to 114 in FIG. 10B, as in the case of the previously described registering mode, that the department key 12 has been manually operated, the registering mode has been set and the FD flag has been set. At the step 121 the content in the WD register 3c is subtracted from the total amount of sales per day in the area 311. More specifically, the deduction amount "50" is subtracted from the total amount of sales per day. At the step 122 the deduction amount is subtracted from the total amount of sales in the area 313 as well. At the step 123 the deduction amount is stored in the area 314 as the loss on sales and then the FD flag and the FN flag are cleared, whereby the central processing unit 2 returns to an initial condition.

Now an operation for preparing a sales report and a profit report will be described. Preparation of a sales report or a profit report is specified by the numerical value entered from the numeral keys 13. In the case of the embodiment shown, the convention is determined that a sales report is to be prepared when the numerical value "1" is entered from the numeral keys 13 and a profit report is to be prepared when the numerical value "2" is entered from the numeral keys 13. In preparing a sales report, first an operator manually operates the mode selecting switch 11 in the order of manual operations of keys shown in FIG. 6, thereby to set the check mode (Y) or the liquidation mode (Z). Then the numerical value "1" is entered from the numeral keys 13. The central processing unit 2 is in a standby state until key entry is made at the step 124 in FIG. 11A and determines at the step 125 that a key entered signal is applied, when the same is obtained from the numeral keys 13, and the FN flag is set at the step 126. At the step 127 the entered numerical value "1" is stored in the WN register 3d.

Then an operator operates the report key 141 for the purpose of commanding preparation of a report. At the step 128 the central processing unit 2 determines that the report key 141 is manually operated and at the steps 129 and 130 determines whether the check mode or the liquidation mode has been set and the FN flag has been set. If and when the above described setting has not been properly made, the central processing unit 2 performs error processing. On the other hand, if the above described setting has been properly made, then at the step 131 it is determined whether the content in the WN register 3d is "1". If and when the content in the WN register 3d is "1", then at the step 132 the content in the area of the total amount of sales per day of the departments 1 to 10 is read out and the same is printed on a receipt sheet by means of the printer 5. Since the information concerning the price was registered as "450" only with respect to the department 1 in the foregoing description, the information to the effect that the total amount of sales for the department 1 is "450" is printed on a receipt sheet, as shown in FIG. 8. Then the number of sales per day is read out from the area 312 of the department 1 and the number is printed on the next line of the receipt sheet. When the central processing unit 2 ends a printing operation of the sales report, at the step 133 the central processing unit 2 determines whether the liquidation mode has been selected by the mode selecting switch 11. If the operation is not in the liquidation mode, then at the step 136 only the FN flag is reset. On the other hand, if the operation is in the liquidation mode, then at the steps 134 and 135 the contents in the areas 311 and 312 are all cleared.

In the case where a profit report is to be prepared, manual key operation is made in accordance with the order of manual operations of the keys as shown in FIG. 7. More specifically, the check or liquidation mode is set by the mode selecting switch 11 and the numerical value "2" is entered from the numeral keys 13. When the central processing unit 2 determines at the step 137 in FIG. 11B that the numerical value "2" is entered from the numeral keys 13, then at the step 138 a profit report is prepared. The total cost and the total profit can be evaluated by the following equations.

$$\text{total cost} = \left(\text{total amount of sales} + \text{loss on sales}\right) \times \frac{\text{cost multiplier rate}}{10,000}$$

$$\text{total profit} = \text{total amount of sales} - \text{total cost}$$

The central processing unit 2 evaluates the total cost and the total profit based on the above described equations. More specifically, the total amount of sales is read out from the area 313 and the loss on sales is read out from the area 314 and both are subjected to addition. Then the information concerning the cost multiplier rate "8,500" is read out from the area 315 and the same is divided by 10,000. The total cost is thus evaluated. The total cost information is stored in the Y register 3f. Then the total profit information is evaluated by subtracting the total cost from the total amount of sales. Assuming that the same is applied to the previously described registered information, since the total amount of sales is "450" and the loss on sales is "50", the cost "425" is evaluated by multiplying the sum of addition of both the above described total amount of sales "450" and the loss on sales "50" by 8,500/10,000. Then the total profit "25" is evaluated by subtracting the total cost "425" from the total amount of sales "450".

After the above described operations are completed, the central processing unit 2 prints out the total amount of sales "450" of the department 1 on the first line, prints out the loss on sales "50" on the next line, prints out the total cost "425" on the following line and prints out the total profit "25" on the further following line. After the profit report is thus prepared, at the step 136 the FN flag is cleared, whereupon the central processing unit 2 returns to an initial condition, unless the liquidation mode has been set. If and when the liquidation mode has been set, then at the steps 140 and 141 the contents in the areas 313 and 314 are all cleared and the FN flag is reset, whereby the central processing unit 2 returns to an initial condition.

As described above, according to the embodiment shown, the total cost and the total profit are evaluated responsive to the entry of the numeral values from the numeral keys 13 and the entry from the report key 141 and based on the total amount of sales and the cost multiplier rate. On the other hand, since the deduction amount is subtracted from the total amount of sales on the occasion of deduction sales, the deduction amount does not influence the total amount of sales in evaluating the total cost and the total profit, with the result that the total cost and the total profit can be correctly evaluated.

In the above described embodiment a receipt was printed by a printer in preparing a report. In addition, the amount of the profit may be displayed in the display 4.

Also, although in the above described embodiment the cost multiplier rate was stored as information concerning the cost, instead, the cost information may be stored directly. In such a case, the number of sales is multiplied by the cost with respect to the commodity and subtraction is made of the product obtained by the above described multiplication from the total amount of sales, in order to evaluate the total profit.

The inventive apparatus may also be adapted such that the cost multiplier rate and the cost can be preset only by a manager of a shop where such apparatus is installed. The inventive apparatus may further be adapted such that a new key is provided for reading the cost multiplier rate and the total profit is evaluated in response to manual operation of the report key 141 after the read key is manually operated by an operator.

The inventive apparatus may be further adapted such that an area is provided in the memory 3 for the purpose of storing the evaluated total profit, and the total amount of sales so far accumulated is cleared and at the same time the profit is accumulatively stored each time the total profit is evaluated and a profit report is prepared.

It is further pointed out that the present invention can be also applied to a case where a profit is evaluated based on a retail method on inventories using the inventory amount, the purchasing amount and the total amount of sales rather than evaluating the profit based on the above described cost multiplier rate and the total amount of sales.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transaction processing apparatus for processing information related to a plurality of individual transactions as the transactions are carried out, comprising:

mode selecting means for setting said apparatus in a first mode or a second mode;

input means for entering data into said apparatus, said data including numerical data, department code data representing a plurality of department codes, each of said department codes representing a plurality of commodities, and deduction command data;

memory means for storing data, said memory means including: for each department code, a cost register for storing commodity cost data; for each department code, a sales amount register for storing sales amount data; a deduction register for storing deduction amount data; for each department code, a total deduction register for storing total deduction data; and a working register for storing inputted numerical data;

means responsive to said apparatus being in said first mode and to the entry of numerical data for storing said numerical data in said working register;

means responsive to said apparatus being in said first mode, and to each entry of said deduction command data for transferring the contents of said working register to said deduction register;

means responsive to said apparatus being in said first mode, and to each entry of said numerical data followed by the entry of department code data for adding the contents of said working register to the contents of said sales amount register for the entered department code;

means responsive to said apparatus being in said first mode, and to each entry of said deduction command data followed by the entry of said department code data for substracting the contents of said deduction register from the contents of said sales amount register for the entered department code, and adding the contents of said deduction register to the contents of said total deduction register for the entered department code; and means responsive to setting said apparatus in said second mode for producing for each commodity code, total cost data using said commodity cost data, said sales amount data, and said total deduction amount data, and for producing total profit data by substracting said total cost data from said sales amount data.

2. An apparatus in accordance with claim 1, wherein said cost register stores a cost multiplier rate, and wherein said producing means adds said total sales data and said total deduction data and multiplies the resultant figure by said cost multiplier rate to provide cost information.

3. An apparatus according to claim 1, wherein said memory means further includes for each department code, a register for storing total number of sales data, and wherein said means responsive to said apparatus being in said first mode and to the entry of numerical data followed by the entry of said department code data is operative to increment said register for storing total number of sales data for the entered department code.

4. An apparatus according to claim 1, including means responsive to said apparatus being in said second mode for clearing said sales amount registers and said total deduction amount registers.

5. A transaction processing apparatus in accordance with claim 1, wherein said producing means prints out, for each department code, said sales amount data, said total deduction data, said total cost data, and said total profit data.

6. A transaction processing apparatus in accordance with claim 5, wherein said mode selecting means comprises numerical keys and means for commanding a printed report.

* * * * *